May 22, 1923.

W. W. HARTMAN 1,456,270

SUGAR WASHING AND WATER MEASURING DEVICE

Filed May 19, 1919     6 Sheets-Sheet 1

Witness
C. C. Holly.

Inventor
William Walter Hartman
By James R. Townsend
his atty.

May 22, 1923.
W. W. HARTMAN
1,456,270
SUGAR WASHING AND WATER MEASURING DEVICE
Filed May 19, 1919 6 Sheets-Sheet 2
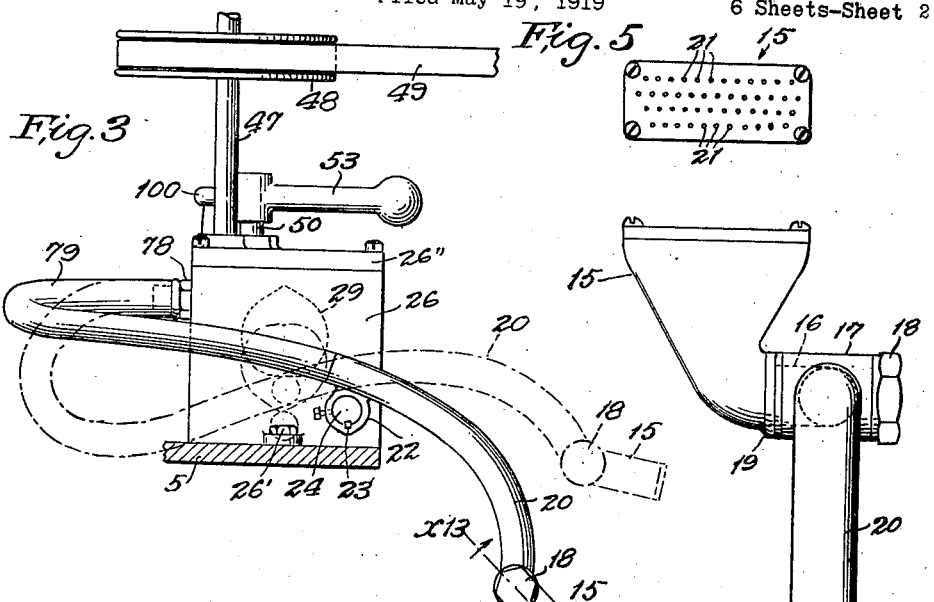
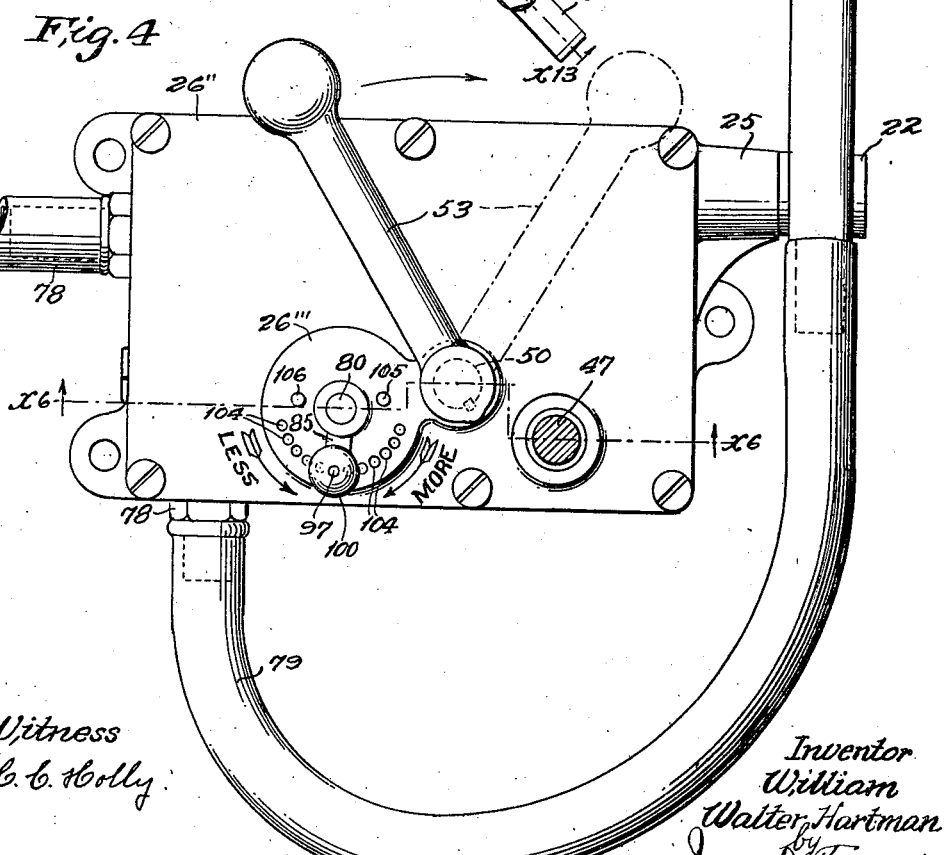
Witness
C. C. Holly
Inventor
William Walter Hartman
by James R. Townsend
his Atty.

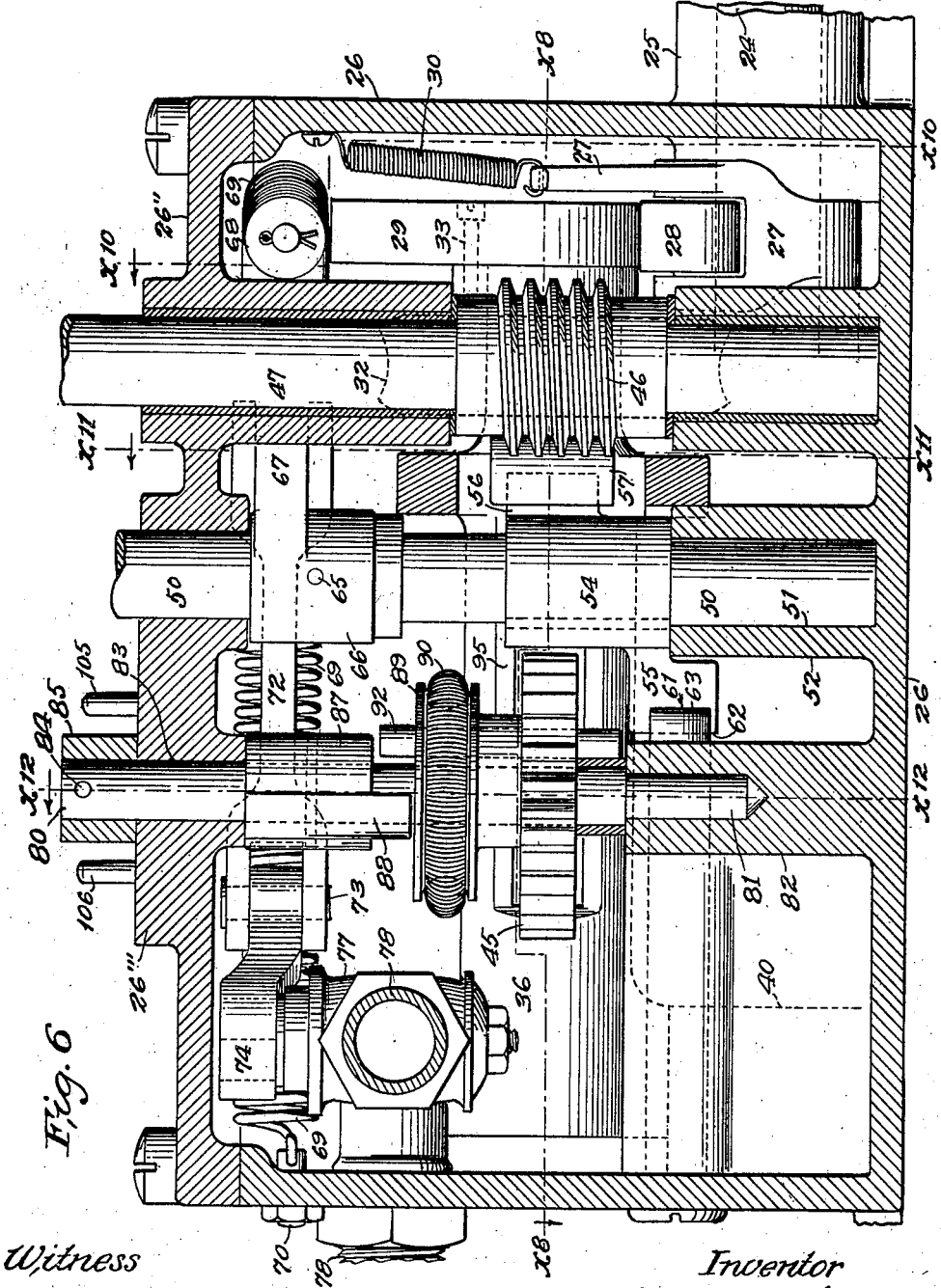

May 22, 1923.

W. W. HARTMAN 1,456,270

SUGAR WASHING AND WATER MEASURING DEVICE

Filed May 19, 1919

Witness
C. C. Holly

Inventor
William Walter Hartman
by James R. Townsend
his Atty.

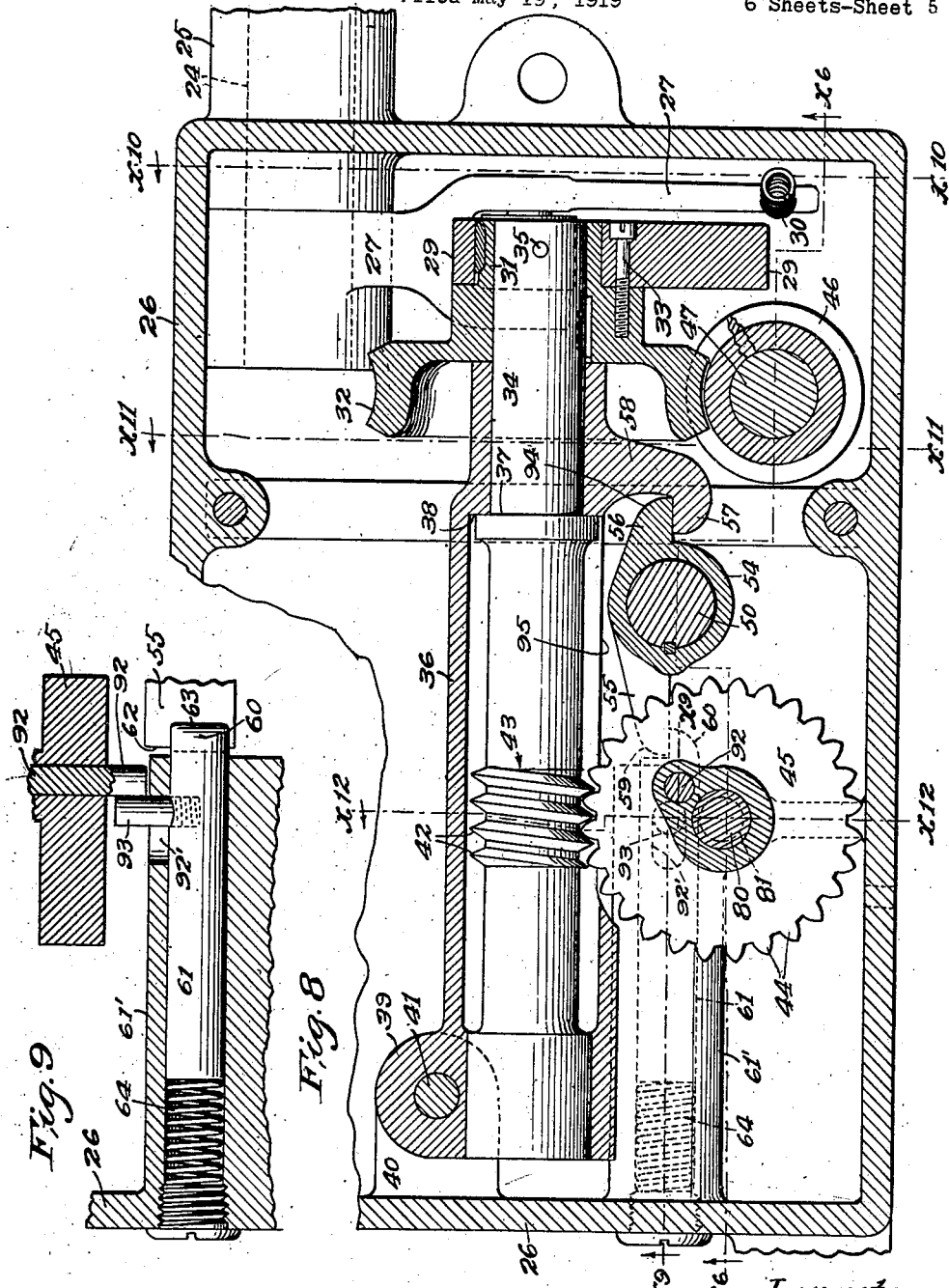

May 22, 1923.

W. W. HARTMAN

SUGAR WASHING AND WATER MEASURING DEVICE

Filed May 19, 1919 6 Sheets-Sheet 6

Witness
C. C. Holly

Inventor
William Walter Hartman
by James R. Townsend
his Atty.

Patented May 22, 1923.

1,456,270

UNITED STATES PATENT OFFICE.

WILLIAM WALTER HARTMAN, OF LOS ANGELES, CALIFORNIA.

SUGAR-WASHING AND WATER-MEASURING DEVICE.

Application filed May 19, 1919. Serial No. 298,324.

*To all whom it may concern:*

Be it known that I, WILLIAM WALTER HARTMAN, a citizen of the United States, residing at Los Angeles, in the county of Los Angeles and State of California, have invented a new and useful Sugar-Washing and Water-Measuring Device, of which the following is a specification.

In washing sugar centrifugals it is desirable that the water be distributed scientifically over the entire sugar wall, and this problem is complicated somewhat by the fact that the wall usually diminishes gradually in thickness from the bottom toward the top of the basket.

Among other objects, it is an object of this invention to improve and simplify all centrifugal sugar-washing machines in general, but in particular to improve that class of scientific washers in which a spray of wash-water is alternately swept along the height of the centrifugal basket, traveling slower below where the sugar wall is thick, and more rapidly above where the sugar wall is thinner and varying gradually in between in proportion to the thickness of the sugar wall at the successive levels.

In addition, and with reference to all types of centrifugal sugar washers, this invention is broadly new, basic and pioneer in that the apparatus is so constructed that it is driven directly from the power which rotates the centrifugal basket and through this agency several important advantages are gained, as will appear in subsequent parts of this specification.

Further objects, advantages and features of the invention may appear from the accompanying drawings, the subjoined detailed description and the appended claims.

Reference is hereby made to my copending application, Serial No. 453,956, filed March 21st, 1921, and permission is hereby reserved to claim in that application separately patentable matter shown but not claimed in this application.

In fact in drawing the claims herein I have confined this application to the aforesaid separate invention of driving the sprayer parts from the centrifugal shaft, and each of the claims in this application will be found to depend for its novelty upon this basic feature of driving from the centrifugal shaft, the same being variously expressed in combination with other elements and features with which it cooperates.

The accompanying drawings illustrate the invention.

Fig. 3 is a side elevation of the automatic apparatus on a larger scale than in Figs. 1 and 2.

Fig. 4 is an enlarged plan of the automatic apparatus shown in Fig. 3.

Fig. 5 is an end view of the nozzle shown in the preceding views.

Fig. 6 is an enlarged elevation of the internal mechanism of the automatic apparatus sectioned on the staggered line $x^6$ Figs. 4, 7 and 8.

Fig. 8 is a sectional plan detail on line $x^8$ Fig. 6, showing the parts in operating position.

Fig. 9 is a detail in section elevation on line $x^9$, Fig. 8.

Figure 1:
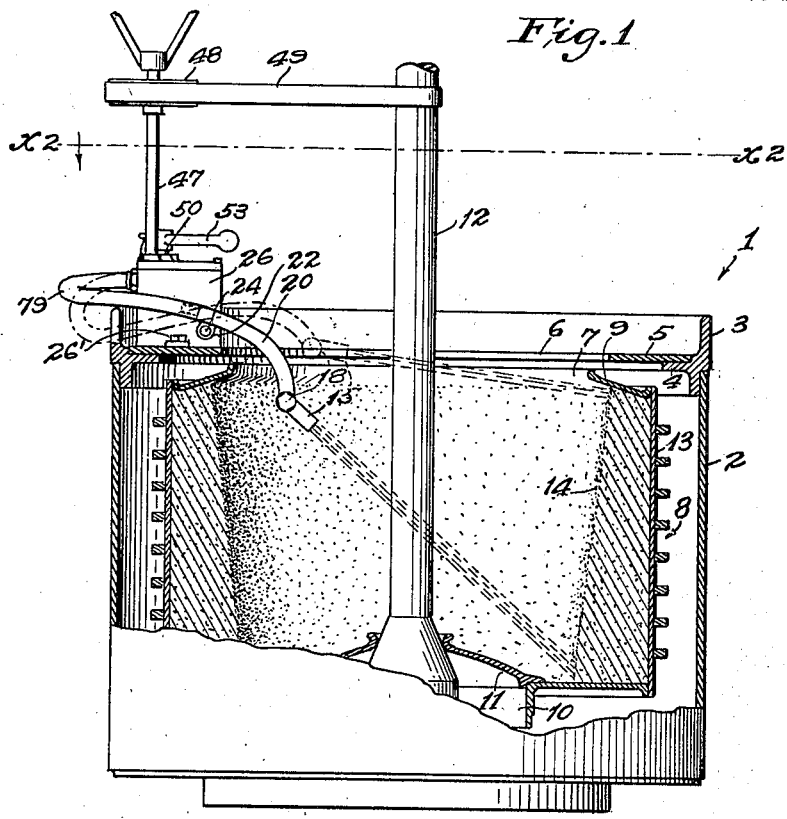
Figure 1 is an elevation of sugar washing apparatus, constructed in accordance with this invention and applied in connection with a sugar centrifugal, which is shown mainly in vertical mid-section on line $x^1$ Fig. 2.

In detail the centrifugal sugar separator 1 is provided with a receptacle having a cylindrical wall 2; and on the upper end of this wall 2 there is secured a flange top piece 3, which top piece has on the flange 4 thereof the disk 5.

The disk 5 has a central opening 6 that is larger than the top opening 7 in the centrifugal basket 8; and as seen in Fig. 1 the top of the basket 8 is provided with the beveled plate 9 which plate has the opening 7 therethrough; and the purpose of this plate is to prevent the massecuite from climbing over the top of the basket 8 when this material is subjected to centrifugal force.

The basket 8 is provided with the usual opening 10 in the bottom thereof which opening is normally closed by the cover 11 which cover is slidably mounted on the vertical shaft 12.

The basket 8 is secured in the usual way to the bottom end of the shaft 12 thereby allowing the basket and shaft to gyrate about an upper support in a manner well known to those acquainted in the art.

The rapid rotation or spinning of the basket 8 causes the massecuite to climb the perforated wall 13 of the basket 8, and through the perforations of the wall 13 the molasses escapes from the massecuite and leaves in the basket the sugar crystals which sugar is compactly formed into a cylindrical wall 14. All of the foregoing mechanism and its operation is old and well understood and is given to make clear the purpose of this invention.

A general purpose of this invention is to supply a means for cleansing the wall of sugar; for, as is well known, centrifugal force alone is not sufficient to drive all of the molasses from the sugar wall; consequently it is necessary to apply a small water spray to the inner side of the cylindrical wall of sugar to dissolve the molasses and reduce the adhesiveness thereof so that the centrifugal force imparted to the basket will remove this residue of syrup, but this washing of the sugar wall requires great skill in order to cleanse the sugar crystals without dissolving them.

The application of the washing water to the sugar wall 14 is applied in the following manner.

A spray nozzle 15 has integral therewith one end of the cylinder 16 and this cylinder is loosely mounted in the casing 17 which casing is also cylindrical in form.

The other end of the cylinder 16 is threaded, and secured thereto is the cap nut 18, which nut when tightened contacts with one end of the casing 17 and also draws the shoulder 19 of the nozzle 15 tightly against the other end of the casing 17; and the tight contact of the nut 18 and shoulder 19 with the casing 17 holds the nozzle 15 in a fixed position relative to the casing. To adjust the nozzle to another position the nut 18 is loosened so that the cylinder 16 can be turned in the casing 17; and when the adjustment is accomplished the tension of the parts can again be established for the purpose specified.

A pipe 20 has one end thereof attached to the casing 17 and openings in the casing 17 and cylinder 16 register with the opening through the pipe 20 so that water passing through said pipe to the nozzle 15 will discharge therefrom through the small openings 21.

Near the other end of the pipe 20, and on the underside thereof there is secured the bearing 22 that is secured by the key 23 to one end of the rocker shaft 24, see Figs. 1 and 3; and by means of the rocker shaft 24 the nozzle 15 is oscillated to move the spray of washing water alternately from the top to the bottom of the sugar wall 14 as shown by the full and dotted lines in Fig. 1.

As this spray is moved alternately from its highest to its lowest position the sugar wall 14 is revolved so that in reality the contact of the spray with the wall is in a helical course in one direction as the spray moves downward and a reverse helix as the spray moves upward; and also the movement of the spray upward and downward is timed so it will contact with the entire inner surface of the sugar wall 14.

Figure 2:
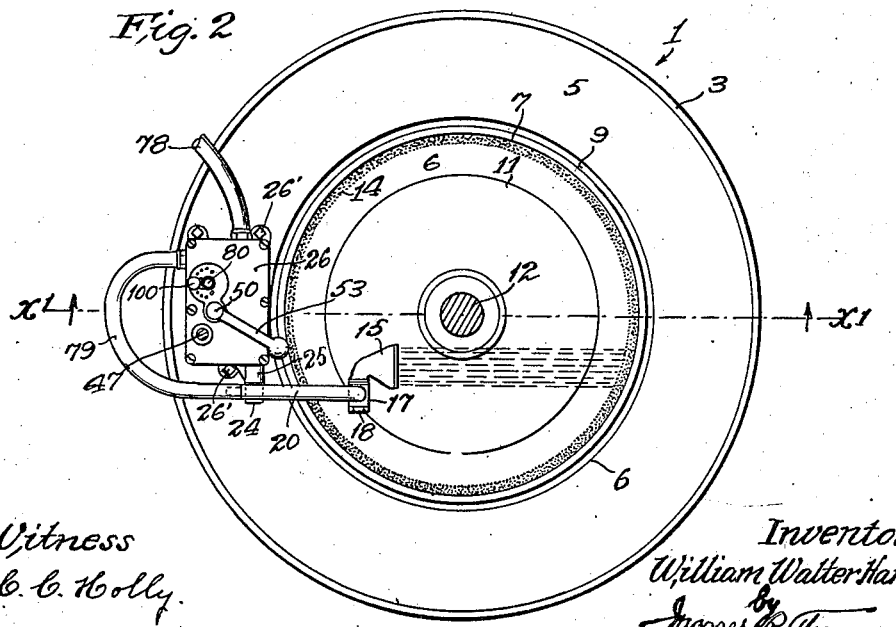
Fig. 2 is a section on the line $x^2$ of Fig. 1 showing a plan view of the apparatus in operation.

The shaft 24 is mounted in a bearing 25 that is integral with the end wall of a box 26, which box is secured to the disk 5 by bolts 26′ as seen in Figs. 1, 2 and 3. The other end of the shaft 24 has thereon the rocker arm 27, which arm has thereon the roller 28 and this roller is held in contact with the periphery of the cam 29 by a spring 30 and one end of this spring is secured to the wall of the box 26 and the other end to the arm 27.

The cam 29 is keyed to the hub 31 of the worm gear 32 and additionally secured to said gear by the screw 33, see Fig. 8; so that when the worm gear 32 is rotated it will turn the cam to depress the rocker arm 27 which movement of the arm 27 oscillates the pipe 20 and the spray nozzle 15.

The cam 29 is carefully constructed so that it operates the roller 28 and consequently the rock arm 27 and rock shaft 24 and consequently the nozzle 15 in predetermined relation to the thickness of the wall of sugar as it is revolved by the shaft 12.

To this end the periphery of the cam 29 is positioned at various points different radial distances from the axis of the cam shaft 34, one end of the cam being provided with a flat face $a$ at one end diametrically opposite to a point $b$ that is shown as located from the axis of the shaft 34 twice as far as the nearest approach of said flat face to said axis. The limbs $c$ and $d$ of the peripheral face of said cam between the flat face $a$ and the point $b$ are alike.

The cam shown in the drawings is constructed to allow the roller 28 and consequently the nozzle 15 to hesitate or travel slower when the stream is directed to the bottom of the sugar column 14 than during the other periods of its travel, the change from down to up motion being made with slower travel of the nozzle; as the spray is directed toward the upper portion of the sugar column the speed is accelerated; and the downward motion of the nozzle is retarded as the spray approaches the base of the column.

The worm gear 32 is fixed by pin 35 to a shaft 34 which is journalled in a cylindrical oscillating bearing 36 and has a shoulder 37 that abuts the shoulder 38 of bearing 36 so that when the gear 32 is secured in place the shaft 34 is locked against endwise movement.

The end of bearing 36 opposite to the worm gear 32 is provided with a lug 39 that is pivotally mounted on the extension 40 on the end of the box 26; and through the lug 39 and extension 40 there is a pin 41 that permits pivotal movement of the bearing 36 and associated parts.

Bearing 36 is open on one side so that the teeth 42 of the worm 43 on the oscillatable shaft 34 can engage the teeth 44 of the timing worm gear 45 when the sleeve 36 is moved to bring the worm gear 32 into mesh with the teeth of the worm 46; for normally the gear 32 is disengaged from the worm 46.

The drive shaft 47 to which the worm 46 is secured extends upward from the top of the box 26 and has on the upper end thereof the pulley 48 that is connected by a belt 49 to the centrifugal shaft 12 and by this connection the worm 46 is enabled to drive the shaft carrying the actuating members when the latter require driving.

To those acquainted with the art the importance will at once be apparent of establishing this belt connection at a point on the centrifugal shaft substantially above the basket and stationary curbing 3, Fig. 1, of the centrifugal, because the lateral gyrations of the shaft and basket are often large especially toward the bottom of the shaft where the basket is fastened, and these gyrations are smaller or negligible at points substantially above the basket, and by making this belt connection at approximately the level shown in Figure 1, the difficulties arising from gyration, and from other operative conditions, are practically eliminated.

However, the precise point on the centrifugal spindle at which this driving connection is made can of course be varied considerably with more or less advantage according to the opinion of the builder or user of these machines, and this driving connection with the centrifugal spindle can be made either directly on to member 12 or on to any member connected and rotating with member 12. Also though I have shown the belt and drive shaft 47 as a preferred form of driving connection between the centrifugal spindle and the washer mechanism, yet this form can be considerably varied, and the belt can be replaced by any other well known driving expedient such as a chain, or the like, without departing from the spirit of my invention.

The worm gear 32 is moved into mesh with the driving worm 46 by the following means; a rod 50 has its lower end mounted in the socket 51 of the upwardly extending bearing 52 that is integral with the bottom of the box 26.

The rod 50 extends upward through the top of the box 26 and has on the upper end thereof the hand lever 53, by which the rod 50 is turned.

Within the box 26 there is secured to the rod 50 the hub 54 which hub has thereon the dogs 55 and 56.

When the lever 53 is moved from the full line toward the dotted position shown in Fig. 4 it turns the rod 50, and this movement of the rod 50 causes the dog 56 to engage the dog 57 on the extension 58 of bearing 36, and this causes the rounded portion 59 of the dog 55 to engage the rounded portion 60 of the latch 61.

As the lever 53 is moved on to the dotted position above referred to the dog 55 will push the latch 61 out of the way or until the edge 62 of the dog 55 has passed the edge 63 of the latch 61 after which the spring 64 against which the latch has been pressed will force the latch outward and lock the rod 50 against an opposite movement.

Figure 7:
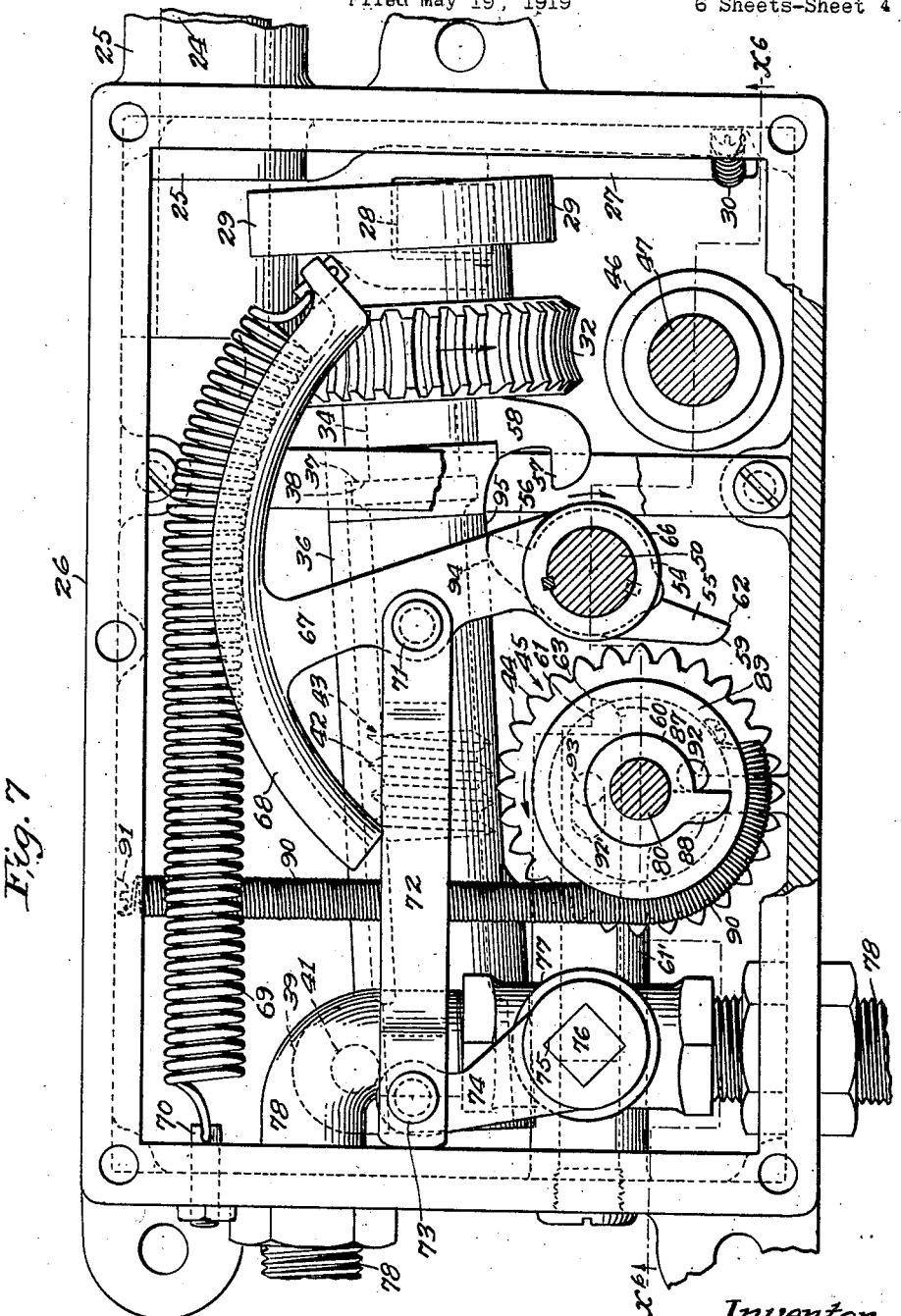
Fig. 7 is a plan on the same scale as Fig. 6, external part and the cover of the housing removed; the internal parts are shown at rest.
Figure 10:
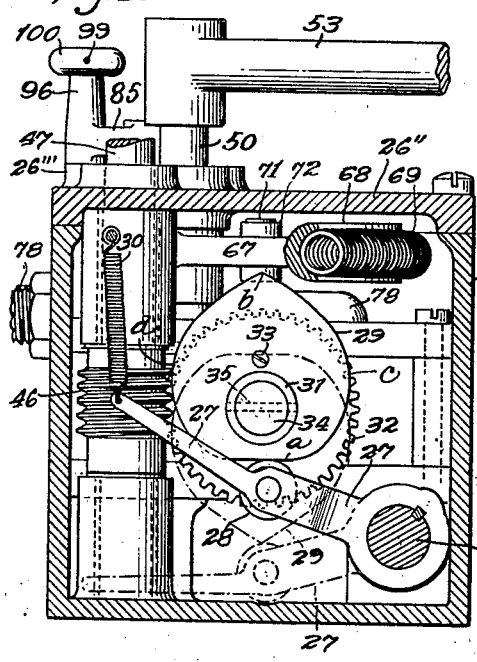
Fig. 10 is a sectional elevation on line $x^{10}$ Figs. 6 and 8; parts drawn to a small scale.
Figure 11:
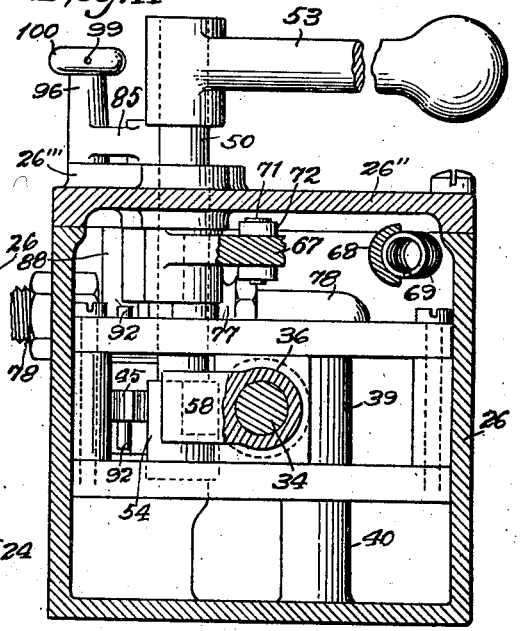
Fig. 11 is a sectional elevation on line $x^{11}$ Figs. 6 and 8; and drawn to the same scale as Fig. 10.

In the meantime the dog 56 will push the dog 57 in the direction of the arrow shown in Fig. 7 and this movement of parts will move the sleeve 36 on the pivot pin 41 and bring the worm gear 32 into mesh with the teeth of the worm 46 and also bring the worm 43 into mesh with the worm wheel 45.

Also the movement of the lever 53 from the full line to the dotted position in Fig. 4 accomplishes another movement of parts that are connected to the rod 50.

There is secured to the rod 50 by the pin 65 a hub 66 that has extending therefrom the arm 67 to the outer end of which is fixed the segmental sleeve pulley 68 to one end of which segment is secured one end of the spring 69 having its other end secured to a bolt 70 that extends through the end of the box 26.

About mid-way of the arm 67 there is pivotally secured by the pin 71, one end of the connecting bar 72 the other end of which is pivotally connected by the pin 73 to the outer end of the lever 74, the inner end of which is fitted at 75 to the cock stem 76 of a common water pipe cock 77.

When the lever 53 is moved to the right in Fig. 4 the worm gears and the worm mesh, a tension on the spring 69 is established and the pipe cock 77 is opened so that water under pressure from a supply not shown will pass through the pipe 78, cock 77 and flexible pipe 79 to the pipe 20 to discharge from the nozzle 15.

As soon as the teeth of the worm gear 32 mesh with the teeth of the rotating worm 46, the shaft 34 will be rotated to actuate the cam 29 to rock the rocker arm 27, and oscillates shaft 24, thus oscillating pipe 20 and causing the spray of water from the nozzle 15 to sweep alternately from top to bottom of the centrifugal basket 8; so that the spray will be applied to the entire inner surface of the sugar wall 14.

It is necessary to proportion the washing water to the thickness of the sugar wall; and it is necessary in determining the amount of washing water required, to consider the adhesiveness of the molasses remaining in the sugar; and this variation in thickness of the sugar wall and adhesiveness of the molasses necessitates a wide range in the application of water, some sugar walls requiring very little and some a very large amount to cleanse them.

From the foregoing it can readily be seen that it is necessary to have a quick and easy means for varying the amount of washing water applied to the sugar wall; and in this invention this variation is controlled by a timer that is connected to the apparatus, and is operated by the timing worm 43 which worm is moved into mesh with the worm gear 45 by operation of lever 53.

Figure 12:
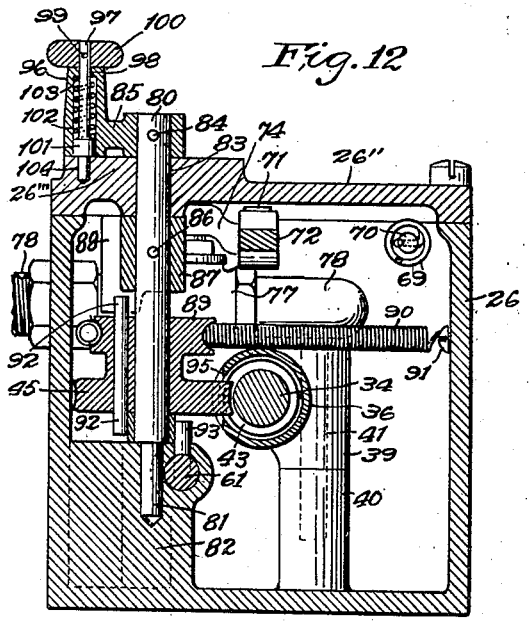
Fig. 12 is a sectional elevation on line $x^{12}$ Figs. 6 and 8; and drawn to the same scale as Figs. 10 and 11.
Figure 13:
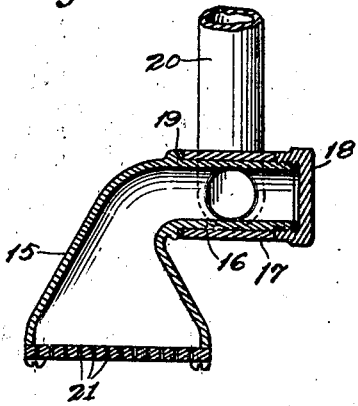
Fig. 13 is a section on the line $x^{13}$ of Fig. 3.

The worm gear 45 is loosely mounted on the bearing pin 80; and the pin 80 has a reduced end 81 that is mounted in the bearing block 82 which block is integral with the box 26, also the upper end of the bearing pin 80 passes through an opening 83 in the lid of the box 26; and on the extending end of the bearing pin 80 there is secured by the pin 84 the shank of the timing lever 85, see Fig. 12.

Within the box 26 there is secured to the timing pin 80 by a pin 86 the hub 87 of a movable stop 88; and the purpose of which is to limit the movement of the worm gear 45.

The worm gear 45 has integral therewith the hub of the sleeve pulley 89 and to this pulley is attached one end of a spring 90 which spring has its other end secured to the wall of the box 26 by the screw 91; and normally this spring is under tension and holds one end of a pin 92 in engagement with the stop 88.

The pin 92 is of considerable length and is shrunk or tightly secured in the hub of the worm gear 45 and integral sleeve pulley 89 and the ends of this pin 92 extend beyond the pulley and gear. The upper end of the pin 92 contacts with the stop 88 and limits the movement of the worm gear in the direction of the spring tension; and the other end of the pin 92 contacts with the pin 93 on the latch 61, and moves the latch against the spring 64 when the worm gear 45 is actuated by the worm 43; and as seen in Fig. 9 the pin 93 is guided by the side walls of the slot 92' and this slot is in the casing 61' in which a latch 61 is mounted.

When the lever 53 is swung from the spraying position of Fig. 6 to the rest position of Fig. 7, thus oscillating rod 50, dogs 55, 56 and bearing 36, to mesh worm gear 32 with worm 46 and worm 43 with worm gear 45, the gears will be locked in mesh by the latch 61 engaging and holding the dog 55; and the gears will be driven by shaft 47, thus rotating worm gear 45 until pin 92 engages pin 93 on latch 61 and moves said latch to release the dog 55; and thereupon the spring 69 actuates the arm 67 which turns the rod 50 and associated parts back to the spraying position shown in Fig. 6. This movement of the rod 50 causes the cam surface 94 of the dog 56 to act on the surface 95 of the oscillating bearing 36 to move said bearing and associated parts back to their rest position, thus releasing worm gear 32 from worm 46 and worm gear 45 from worm 43.

When the worm gear 45 is released from the worm 43 the spring 90 moves the gear back until the pin 92 contacts with the stop 88.

Also as the spring 69 moves the arm 67, the bar 72 will move the lever 74 and close the cock 77, which of course shuts off the supply of water to the nozzle 15.

From the foregoing it can readily be seen that after a number of revolutions of the worm 43 the worm gear 45 will be turned to release the latch 61 and permit the worm gears to be disengaged and parts to return to normal or idle position.

A means is provided for increasing or decreasing the number of revolutions of the worm 43 to release the latch 61, thereby increasing or decreasing the amount of water passing to the spray nozzle 15.

Integral with the outer end of the lever 85 is an upwardly extending cylindrical boss 96 in which there is mounted the pin 97.

The pin 97 has one end thereof passing through the reduced opening 98 in the upper end of the boss 96 and on this end of the pin 97 is secured by a pin 99 the knob 100.

Near the lower end of the pin 97 and integral therewith is an enlarged portion 101, the upper surface of which forms a seat for the spring 102; and the other end of the spring 102 contacts with the shoulder 103 at the upper end of the cylinder in the boss 96.

The portion of the pin 97 below the enlargement 101 is adapted to fit into any one of a plurality of holes 104 in the raised portion 26''' of the box cover 26'' and these holes are an equal radial distance from the center of the pin 80 so that when the pin 97 is lifted to free the lower point thereof from one of the holes 104 the lever 85 can be moved to another position where the pin 97 will register with another of said holes; and by releasing the knob 100 the spring 102 will force the pin 97 downward to lock the lever 85 against further movement.

The purpose of the lever 85 and its associated parts is to move the stop 88 either toward or away from the pin 92 and as previously stated this movement of the stop 88 either increases or decreases the number of revolutions of the worm 43 before the trip disconnects the worm gear 32 from the drive worm 46.

In other words when the lever 85 is in a position where it contacts with the stop 105 the worm 43 will need to turn but five revolutions before it has moved the worm gear 45 to a position where the pin 92 will release the latch 61 and disconnect the driving mechanism; and when the lever 85 contacts with the stop 106 the worm 43 will make about fifteen revolutions before the trip is tripped, consequently to increase the applications of washing water to the sugar lever 85 is moved toward the stop 106 and to decrease the wash the reverse movement of the lever is made.

Also it will be understood that at each revolution of the shaft 34 the cam 29 and spring 30 will operate the lever 27 to move the shaft 24 and consequently rock the pipe 20 down and up which moves the spray nozzle 15 and applies to the wall of sugar a spray of water; and, as previously indicated, the wall of sugar is rapidly rotated by the centrifugal so that in reality the downward movement of the spray defines on the sugar wall a helix that is reversed as the spray moves upward.

In operation the operator determines from the thickness of the sugar wall and adhesiveness of the molasses remaining after the sugar wall has been formed in the basket, how much water will be required to wash the sugar and accordingly moves the lever 85 to a position that will give the desired result. Then the lever 53 is moved from the full line to the dotted position shown in Fig. 4, which will move the worm gear 32 into engagement with the worm 46 on drive shaft 47.

Also this movement of the lever 53 will operate the latch 61 to lock the worms and worm gears in engagement until the latch 61 is released as heretofore described; and in the meantime of course the cock 77 has been opened and the spray nozzle oscillated to wash the sugar; and when the latch 61 is released the cock 77 is automatically closed.

The adjustment of the lever 85 for changing the wash to suit the sugar is usually performed by an expert skilled in sugar washing and when once set for a quantity of massecuite is left until he deems another adjustment necessary.

In reviewing the above operation it will, of course, be clear that that portion of the mechanism including the centrifugal shaft 12, the belt 49, the vertical shaft 47 and the worm 46, constitutes only a train of driving mechanism, as will be apparent from the fact that the sole and exclusive function of this entire train is to drive or to transmit power into the important subsequent members where the true actuating or functional movements of the washer are performed.

The first of these actuating, or truly functional, members, beyond the train of driving mechanism, is termed the actuating shaft, and comprises the shaft 34, carrying the nozzle actuating cam 29, and the timing worm 43, the actuating functions of these members being obviously the two most important functions in the entire device.

This invention is characterized by the fact that this actuating shaft is allowed normally to lie idle and at rest, and that it operates only for very brief periods, perhaps fifteen seconds every four minutes about, while the actual work of spraying the sugar is in process. This prolonged idleness is more important than might at first appear. In manufacturing these washers this actuating shaft and parts are originally made and fitted with a high degree of accuracy in order to insure the accurate and scientific distribution of the wash-water contemplated in this class of washers. Consequently since continuous operation of the actuating shaft, produces unnecessary wear in the bearings, and thus impairs the accuracy of the washing function, this normal idleness of the actuating shaft eliminates all unnecessary wear and protects this member, thus prolonging the original accuracy and usefulness and reflecting creditably on the value of the entire machine.

On the other hand, though the driving worm 46, and the other parts in the driving train above mentioned, operate somewhat more than the actuating shaft, this is of little consequence, as the driving members are relatively cruder than the actuating members and the wear occasioned in the driving members by slight excess operation, in no way impairs the accuracy with which the real washing function is performed. However, it should be noted that even this driving worm, and other driving parts, do not operate constantly, but only intermittently with the centrifugal, there being, during normal operation, substantial opportunities of rest occurring periodically about every four minutes when the centrifugal is shut down to remove the cleansed sugar and to take on a new charge of raw massecuite.

By virtue of these driving parts being operated directly off the centrifugal shaft, instead of by a constantly operating motor, they have this advantage of also lying idle, at least during these periods when the centrifugal is shut down and to just this extent the wear and tear on these parts is also reduced, and this reflects further credit upon the life of the machine and its usefulness. However, it should be understood that by driving direct off the centrifugal shaft, particularly from a point on the centrifugal shaft substantially above the centrifugal curbing as illustrated, I secure not only the advantage of reducing the wear as explained, but also the important advantage of eliminating all electrical troubles incident to the use of individual motors which were the usual power source in centrifugal washers before my invention was brought to the attention of the public.

In conclusion it will therefore be seen that in addition to the basic advance in driving directly from the centrifugal shaft, my invention is largely directed to the important object of prolonging as far as possible, the original high degree of accuracy with which these washers are made, this being particularly important in the class of scientific washers of which I have illustrated an example, and I attain the desirable object just mentioned principally by eliminating unnecessary wear through allowing the main actuating members and actuating shaft to lie normally idle, calling this shaft into operation only for the very brief period actually required to distribute the wash-water while same is flowing, and thereafter allowing it to go back to rest until the next washing period arrives.

In the foregoing parts of this specification I have now described minutely the preferred form of my invention, but I wish to point out that it is only the preferred form and is subject to extensive remodeling and changing without departing from the spirit of my invention, and especially I do not limit myself to the particular type of driving train shown between the centrifugal shaft and the actuating shaft, nor do I limit myself to the precise details of the actuating shaft as the same may carry only one of the actuating members in place of both, and the actuating members may be formed to embrace the shaft integrally therewith in place of having a separate piece of shafting therein, and in general I do not limit myself in any particular except as such limitations are expressly set forth in the appended claims.

I claim:

1. In an apparatus for washing sugar, comprising a centrifugal basket having therein a cylindrical wall of sugar, a shaft for rotating the centrifugal basket, and a spray nozzle above and to one side of the centrifugal basket; an oscillating pipe on which said spray nozzle is mounted; a cam for oscillating said pipe; a lever for establishing a driving connection between the shaft of said centrifugal basket and said cam; means for supplying a liquid wash to said spray nozzle when said lever is actuated; and means for automatically shutting off the liquid supply to said nozzle and for disconnecting the driving connection between said shaft and said cam.

2. In an apparatus for washing sugar, comprising a centrifugal basket having therein a wall of sugar, and a gyratory centrifugal shaft for rotating said basket; a nozzle for spraying the sugar in said basket, actuating means for oscillating said nozzle, means constituting a driving connection between said actuating means and said centrifugal shaft, and means for supplying a liquid-wash to said nozzle.

3. In an apparatus for washing sugar, comprising a centrifugal basket having therein a wall of sugar, a gyratory centrifugal shaft for rotating said basket, and a stationary curbing extending around and above said basket; a spray nozzle for spraying the sugar in said basket, actuating means for actuating said nozzle, means constituting a driving connection between said nozzle-actuating means and said centrifugal shaft at a point on said shaft substantially above said stationary curbing, and means for supplying a liquid-wash to said nozzle.

4. In an apparatus for washing sugar, comprising a centrifugal basket having therein a wall of sugar, and a gyratory centrifugal shaft for rotating said basket; a nozzle for spraying the sugar in said basket, a cam for oscillating said nozzle, means constituting a driving connection between said cam and said centrifugal shaft, and means for supplying a liquid-wash to said nozzle.

5. In an apparatus for washing sugar, comprising a centrifugal basket having therein a wall of sugar, a gyratory centrifugal shaft for rotating said basket, and a stationary curbing extending around and above said basket; a spray nozzle for spraying the sugar in said basket, actuating means for actuating said nozzle, means constituting a driving connection between said nozzle-actuating means and said centrifugal shaft at a point on said shaft substantially above said stationary curbing, means for closing and opening said driving connection between the nozzle-actuating means and the centrifugal shaft, and means for supplying a liquid wash to said nozzle.

6. In an apparatus for washing sugar, comprising a centrifugal basket having therein a wall of sugar, a gyratory centrifugal shaft for rotating said basket, and a stationary curbing extending around and above said basket; a spray nozzle for spraying the sugar in said basket, a cam for oscillating said nozzle, means constituting a driving connection between said cam and said centrifugal shaft at a point on said shaft substantially above said stationary curbing, means for closing and automatically opening said driving connection between the nozzle oscillating cam and the centrifugal shaft, and means for supplying a liquid-wash to said nozzle.

7. In an apparatus for washing sugar, comprising a centrifugal basket having therein a wall of sugar, and a gyratory centrifugal shaft for rotating said basket, a nozzle for spraying the sugar in said basket, means for conducting a washing fluid to said nozzle, a cut off valve, valve opening means, an actuating member, means constituting a driving connection between said actuating member and said centrifugal shaft, means for closing said driving connection between said actuating member and said centrifugal shaft, and means for automatically opening said connection between said actuating member and said centrifugal shaft substantially simultaneously with the closing of said valve.

8. In an apparatus for washing sugar, comprising a centrifugal basket having therein a wall of sugar, a gyratory shaft for rotating said basket, and a stationary curbing extending around and above said basket; a nozzle for spraying the sugar in said basket, means for conducting a washing fluid to said nozzle, a cut off valve, valve opening means, an actuating member, means constituting a driving connection between said actuating member and said centrifugal shaft at a point on said shaft substantially above said stationary curbing, means for closing said driving connection between said actuating member and said centrifugal shaft, and means for automatically opening said connection between said actuating member and said centrifugal shaft substantially simultaneously with the closing of said valve.

9. In an apparatus for washing sugar, comprising a centrifugal basket having therein a wall of sugar, and a gyratory centrifugal shaft for rotating said basket, a nozzle for spraying the sugar in said basket, means for conducting a washing fluid to said nozzle, a cut off valve, valve opening means, an actuating member, means constituting a driving connection between said actuating member and said centrifugal shaft, means for closing said driving connection between said actuating member and said centrifugal shaft substantially simultaneously with the opening of said valve, and means for automatically opening said driving connection between said actuating member and said centrifugal shaft substantially simultaneously with the closing of said valve.

10. In an apparatus for washing sugar, comprising a centrifugal basket having therein a wall of sugar, a gyratory centrifugal shaft for rotating said basket, and a stationary curbing extending around and above said shaft; a nozzle for spraying the sugar in said basket, means for conducting a washing fluid to said nozzle, a cut off valve, valve opening means, an actuating member, means constituting a driving connection between said actuating member and said centrifugal shaft at a point on said shaft substantially above said stationary curbing, means for closing said driving connection between said actuating member and said centrifugal shaft substantially simultaneously with the opening of said valve, and means for automatically opening said driving connection between said actuating member and said centrifugal shaft substantially simultaneously with the closing of said valve.

11. In an apparatus for washing sugar, comprising a centrifugal basket having therein a wall of sugar, and a gyratory centrifugal shaft for rotating said basket; a nozzle adapted to deliver a spray of wash-water to the sugar in said basket, means for actuating said nozzle so as to sweep said spray of wash-water from end to end of said basket successively over the various intervening levels of sugar in said basket, means constituting a driving connection between said actuating means and said centrifugal shaft, and means for supplying a liquid wash to said nozzle.

12. In an apparatus for washing sugar, comprising a centrifugal basket having therein a wall of sugar, a gyratory centrifugal shaft for rotating said basket, and a stationary curbing extending around and above said basket; a spray nozzle adapted to deliver a spray of wash-water to the sugar in said basket, means for actuating said nozzle so as to sweep said spray of wash-water from end to end of said basket successively over the various intervening levels of sugar in said basket, means constituting a driving connection between said nozzle actuating means and said centrifugal shaft at a point on said shaft substantially above said stationary curbing, and means for supplying a liquid wash to said nozzle.

13. In an apparatus for washing sugar, comprising a centrifugal basket having therein a wall of sugar, and a gyratory centrifugal shaft for rotating said basket; a nozzle adapted to deliver a spray of wash-water to the sugar in said basket, a cam adapted to oscillate said nozzle so as to sweep said spray of wash-water from end to end of said basket successively over the various intervening levels of sugar in said basket, means constituting a driving connection between said cam and said centrifugal shaft, and means for supplying a liquid wash to said nozzle.

14. In an apparatus for washing sugar, comprising a centrifugal basket having therein a wall of sugar, a gyratory centrifugal shaft for rotating said basket, and a stationary curbing extending around and above said basket; a nozzle adapted to deliver a spray of wash-water to the sugar in said basket, means for actuating said nozzle so as to sweep said spray of wash-water from end to end of said basket successively over the various intervening levels of sugar in said basket, means constituting a driving connection between said nozzle actuating means and said centrifugal shaft at a point on said shaft substantially above said stationary curbing, means for closing and opening said driving connection between the nozzle actuating means and the centrifugal shaft, and means for supplying a liquid wash to said nozzle.

15. In an apparatus for washing sugar, comprising a centrifugal basket having therein a wall of sugar, a gyratory centrifugal shaft for rotating said basket, and a stationary curbing extending around and above said basket, a nozzle adapted to deliver a spray of wash-water to the sugar in said basket, a cam for oscillating said nozzle so as to sweep said spray of wash-water from end to end of said basket, successively over the intervening levels of sugar in said basket, means constituting a driving connection between said cam and said centrifugal shaft at a point on said shaft substantially above said stationary curbing, means for closing and automatically opening said driving connection between the nozzle oscillating cam and the centrifugal shaft, and means for supplying a liquid wash to said nozzle.

16. In an apparatus for washing sugar, comprising a centrifugal basket, a gyratory centrifugal shaft for rotating said basket, and a stationary curbing extending around and above said basket, a nozzle adapted to deliver a spray of wash-water to the sugar in said basket, an actuating member for actuating said nozzle, and driving means for said actuating member including a vertical shaft fixed in position but adapted to rotate, a gear near the bottom of said shaft, a pulley located on said shaft at a point substantially above said stationary curbing, a belt connection between said pulley and said centrifugal shaft adapted to rotate said pulley and vertical shaft.

17. In an apparatus for washing sugar, comprising a centrifugal basket having therein a wall of sugar, and a gyratory centrifugal shaft for rotating said basket; a nozzle adapted to deliver a spray of wash-water to the sugar in said basket, means for actuating said nozzle, and means constituting a driving connection between said actuating means and said centrifugal shaft, said actuating means being adapted to actuate said nozzle so as to sweep said spray of wash-water differentially from end to end of said basket traveling more slowly over the lower levels and more rapidly over the upper levels in said basket.

18. In an apparatus for washing sugar, comprising a centrifugal basket having therein a wall of sugar, and a gyratory centrifugal shaft for rotating said basket, an oscillatory nozzle adapted to deliver a spray of wash-water to the sugar in said basket, a cam for oscillating said nozzle and means constituting a driving connection between said nozzle oscillating cam and said centrifugal shaft, said cam being adapted to oscillate said nozzle so as to sweep said spray of wash-water differentially from end to end of said basket traveling more slowly over the lower levels and more rapidly over the upper levels in said basket.

19. In an apparatus for washing sugar, comprising a centrifugal basket having therein a wall of sugar, a gyratory centrifugal shaft for rotating said basket, and a stationary curbing extending around and above said basket; a spray nozzle adapted to deliver a spray of wash-water to the sugar in said basket, means for actuating said nozzle, and means constituting a driving connection between said nozzle actuating means and said centrifugal shaft at a point on said shaft substantially above said stationary curbing, said actuating means being adapted to actuate said nozzle so as to sweep said spray of wash-water differentially from end to end of said basket travelling more slowly over the lower levels and more rapidly over the upper levels in said basket.

20. In an apparatus for washing sugar, comprising a centrifugal basket having therein a wall of sugar, a gyratory centrifugal shaft for rotating said basket, and a stationary curbing extending around and above said basket; a spray nozzle adapted to deliver a spray of wash-water to the sugar in said basket, a cam for oscillating said nozzle, and means constituting a driving connection between said nozzle oscillating cam and said centrifugal shaft at a point on said shaft substantially above said stationary curbing, said cam being adapted to oscillate said nozzle so as to sweep said spray of wash-water differentially from end to end of said basket travelling more slowly over the lower levels and more rapidly over the upper levels in said basket.

21. In an apparatus for washing sugar comprising a centrifugal basket having therein a wall of sugar, and a gyrating centrifugal shaft for rotating said basket; a nozzle for spraying the sugar in said basket, actuating means for moving said nozzle, means constituting a driving connection between said actuating means and said centrifugal shaft, and means for supplying a liquid wash to said nozzle.

22. In apparatus for spraying the contents of a centrifugal basket, the combination with the centrifugal basket shaft, of a main actuating shaft having intermittent connection with the centrifugal shaft to be driven thereby, timing mechanism operated by the said actuating shaft, a spray nozzle, a liquid supply pipe therefor, a cut-off valve for said supply pipe and means controlled by said timing mechanism for automatically closing said valve and interrupting the operative connection between said actuating shaft and said centrifugal shaft, substantially as described.

23. In an apparatus for spraying the contents of a centrifugal machine basket, the combination with an oscillatory spray nozzle, a valve controlling the flow of liquid to said nozzle, an actuating shaft, means affording a driving connection between the actuating shaft and the basket spindle of the centrifugal, a controlling member by which the valve is closed and the driving connection interrupted after a predetermined period of operation, and adjustable means for determining the duration of movement of said controlling member, substantially as described.

24. In an apparatus for washing sugar comprising a centrifugal basket having therein a wall of sugar, and a gyratory centrifugal shaft for rotating said basket; a nozzle for spraying the sugar in said basket, actuating means for moving said nozzle, a driving connection including a belt for driving said actuating means from said centrifugal shaft, and means for supplying a liquid wash to said nozzle.

25. In an apparatus for washing sugar, comprising a centrifugal basket having therein a wall of sugar, a gyratory centrifugal shaft for rotating said basket, and a stationary curbing extending around and above said basket; a spray nozzle for spraying the sugar in said basket, actuating means for actuating said nozzle, a driving connection including a belt for driving said actuating means from said centrifugal shaft the place from which said belt is driven being substantially above said stationary curbing, and means for supplying a liquid wash to said nozzle.

26. In an apparatus for washing sugar comprising a centrifugal basket having therein a wall of sugar, and a gyratory centrifugal shaft for rotating said basket; a nozzle for spraying the sugar in said basket, actuating means for moving said nozzle, a vertical drive shaft for driving said actuating means, a driving connection including a belt for driving said vertical drive shaft from said centrifugal shaft, and means for supplying a liquid wash to said nozzle.

27. In an apparatus for washing sugar, comprising a centrifugal basket having therein a wall of sugar, a gyratory centrifugal shaft for rotating said basket, and a stationary curbing extending around and above said basket; a spray nozzle for spraying the sugar in said basket, actuating means for actuating said nozzle, a vertical drive shaft for driving said actuating means, a driving connection including a belt for driving said vertical drive shaft from said centrifugal shaft the place from which said belt is driven being substantially above said stationary curbing, and means for supplying a liquid wash to said nozzle.

28. In an apparatus for washing sugar comprising a centrifugal basket having therein a wall of sugar, and a gyratory centrifugal shaft for rotating said basket; a nozzle for spraying the sugar in said basket, a rotatable actuating cam for moving said nozzle said cam being adapted to exert its operative thrust in a plane substantially at right angles to its axis of rotation, means constituting a driving connection between said actuating cam and said centrifugal shaft, and means for supplying a liquid wash to said nozzle.

29. In an apparatus for washing sugar comprising a centrifugal basket having therein a wall of sugar, a gyratory centrifugal shaft for rotating said basket, and a stationary curbing extending around and above said basket; a spray nozzle for spraying the sugar in said basket, a rotatable actuating cam for moving said nozzle said cam being adapted to produce its operative thrust in a plane substantially at right angles to its axis of rotation, means constituting a driving connection between said actuating cam and said centrifugal shaft at a point on said shaft substantially above said stationary curbing, and means for supplying a liquid wash to said nozzle.

30. In an apparatus for washing sugar comprising a centrifugal basket having therein a wall of sugar, and a gyratory centrifugal shaft for rotating said basket; a nozzle for spraying the sugar in said basket, a rotatable actuating cam for moving said nozzle said cam being adapted to produce its operative thrust in a plane substantially at right angles to its axis of rotation, a driving connection including a belt for driving said actuating cam from said centrifugal shaft, and means for supplying a liquid wash to said nozzle.

31. In an apparatus for washing sugar, comprising a centrifugal basket having therein a wall of sugar, a gyratory centrifugal shaft for rotating said basket, and a stationary curbing extending around and above said basket, a spray nozzle for spraying the sugar in said basket, a rotatable actuating cam for moving said nozzle, said cam being adapted to produce its operative thrust in a plane substantially at right angles to its axis of rotation, a driving connection including a belt for driving said actuating means from said centrifugal shaft the place from which said belt is driven being substantially above said stationary curbing, and means for supplying a liquid wash to said nozzle.

32. In an apparatus for washing sugar comprising a centrifugal basket having therein a wall of sugar, and a gyratory centrifugal shaft for rotating said basket; a nozzle for spraying the sugar in said basket, a rotatable actuating cam for moving said nozzle said cam being adapted to produce its operative thrust in a plane substantially at right angles to its axis of rotation, a vertical drive shaft for driving said actuating cam, a driving connection for driving said vertical drive shaft from said centrifugal shaft, and means for supplying a liquid wash to said nozzle.

33. In an apparatus for washing sugar, comprising a centrifugal basket having therein a wall of sugar, a gyratory centrifugal shaft for rotating said basket, and a stationary curbing extending around and above said basket; a spray nozzle for spraying the sugar in said basket, a rotatable actuating cam for moving said nozzle said cam being adapted to produce its operative thrust in a plane substantially at right angles to its axis of rotation, a vertical drive shaft for driving said actuating cam, a driving connection for driving said vertical drive shaft from said centrifugal shaft the place at which said driving connection is made with said centrifugal shaft being substantially above said stationary curbing, and means for supplying a liquid wash to said basket.

34. In an apparatus for washing sugar comprising a centrifugal basket having therein a wall of sugar, a gyratory centrifugal shaft for rotating said basket, and a stationary curbing extending around and above said basket; a spray nozzle for spraying the sugar in said basket, a rotatable actuating cam for moving said nozzle said cam being adapted to produce its operative thrust in a plane substantially at right angles to its axis of rotation, a vertical drive shaft for driving said actuating means, a driving connection including a belt for driving said vertical drive shaft from said centrifugal shaft the place from which said belt is driven being substantially above said stationary curbing, and means for supplying a liquid wash to said nozzle.

In testimony whereof, I have hereunto set my hand at Los Angeles, California, this 8th day of May, 1919.

WILLIAM WALTER HARTMAN.

Witness:
WM. M. GENTLE.